United States Patent [19]

Sather

[11] 3,755,660

[45] Aug. 28, 1973

[54] DIGITAL WORD MAGNITUDE SELECTION CIRCUIT APPARATUS

[75] Inventor: Delaine C. Sather, Cedar Rapids, Iowa

[73] Assignee: Collins Radio Company, Dallas, Tex.

[22] Filed: Feb. 11, 1972

[21] Appl. No.: 225,444

[52] U.S. Cl. ............................... 235/177, 340/146.2

[51] Int. Cl. ............................................... G06f 7/02

[58] Field of Search .................. 235/177; 340/146.2; 328/104, 115, 116, 169

[56] References Cited

UNITED STATES PATENTS

| | | | |
|---|---|---|---|
| 3,034,103 | 5/1962 | Underwood | 340/146.2 X |
| 3,273,122 | 9/1966 | Chandler | 340/146.2 |
| 3,187,303 | 6/1965 | Chiapuzio et al. | 340/146.2 |
| 3,217,293 | 11/1965 | Metz | 340/146.2 |
| 3,536,903 | 10/1970 | Goshorn et al. | 235/168 |

*Primary Examiner*—Malcolm A. Morrison
*Assistant Examiner*—James F. Gottman
*Attorney*—Bruce C. Lutz et al.

[57] ABSTRACT

A circuit for selecting which one of a pair of binary digital serial word numbers are the least (or most) positive and providing an output indicative of this selected value. Two of these circuits may be used in series for providing an output which is always contained between two limits. The selection is accomplished by subtracting one of the digital numbers from the other and checking the answer. If the answer or difference is negative, the subtrahend is larger than the minuend. On the other hand, if the answer or difference is positive, the minuend is more positive than the subtrahend. A zero answer will indicate that both numbers are equal.

8 Claims, 9 Drawing Figures

$(OUT)_N = A_{N-1}$

IF $A_{N-1}$ IS LESS (+) THAN $B_{N-1}$ $(OUT)_N = B_{N-1}$

IF $B_{N-1}$ IS LESS (+) THAN $A_{N-1}$ $\Delta Z_{N+1} = +1$

IF $B_N$ IS MORE (+) THAN $A_N$ $\Delta Z_{N+1} = -1$

IF $A_N$ IS MORE (+) THAN $B_N$

| SERIAL BINARY WORD — BITS INCREASING WITH TIME → 1 2 3 4 5 6 7 8 9 10 11 12 13 14 15 16 | WEIGHTED VALUE OF WORD |
|---|---|
| 1 1 1 1 1 1 1 1 1 1 1 1 1 1 1 0 | +32767 |
| ⋮ | ⋮ |
| 0 0 0 0 0 0 0 0 0 0 0 0 0 1 1 0 | +24576 |
| ⋮ | ⋮ |
| 0 0 0 0 0 0 0 0 0 0 0 0 0 0 1 0 | +16384 |
| ⋮ | ⋮ |
| 0 0 0 0 0 0 0 0 0 0 0 0 0 1 0 0 | +8192 |
| ⋮ | ⋮ |
| 1 0 0 0 0 0 0 0 0 0 0 0 0 0 0 0 | +1 |
| 0 0 0 0 0 0 0 0 0 0 0 0 0 0 0 0 | 0 |
| 1 1 1 1 1 1 1 1 1 1 1 1 1 1 1 1 | -1 |
| ⋮ | ⋮ |
| 0 0 0 0 0 0 0 0 0 0 0 0 0 1 1 1 | -8192 |
| ⋮ | ⋮ |
| 0 0 0 0 0 0 0 0 0 0 0 0 0 0 1 1 | -16384 |
| ⋮ | ⋮ |
| 0 0 0 0 0 0 0 0 0 0 0 0 0 1 0 1 | -24576 |
| ⋮ | ⋮ |
| 0 0 0 0 0 0 0 0 0 0 0 0 0 0 0 1 | -32768 |

BIT TIME (n) LOGIC TABLE

| B | A | Q | +ΔY | −ΔY | A±B | $Q_{n+1}$ $\overline{SB}$ | $Q_{n+1}$ SB |
|---|---|---|---|---|---|---|---|
| 0 | 0 | 0 | 0 | 1 | 0 | 0 | 0 |
| 1 | 0 | 0 | 0 | 1 | 1 | 0 | 0 |
| 0 | 1 | 0 | 0 | 1 | 1 | 1 | 0 |
| 1 | 1 | 0 | 0 | 1 | 0 | 0 | 0 |
| 0 | 0 | 1 | 0 | 1 | 1 | 1 | 0 |
| 1 | 0 | 1 | 0 | 1 | 0 | 0 | 0 |
| 0 | 1 | 1 | 0 | 1 | 0 | 1 | 0 |
| 1 | 1 | 1 | 0 | 1 | 1 | 1 | 0 |

$(OUT)_N = A_{N-1}$

IF $A_{N-1}$ IS LESS (+) THAN $B_{N-1}$ $(OUT)_N = B_{N-1}$

IF $B_{N-1}$ IS LESS (+) THAN $A_{N-1}$ $(OUT)_N = (IN)_{N-1}$

IF $(IN)_{N-1}$ IS LESS(+) THAN THE LIMIT $(OUT)_N = (LIMIT)$

IF THE (LIMIT) IS LESS (+) THAN $(IN)_{N-1}$ $(OUT)_N = (IN)_{N-2}$

IF $(IN)_{N-2}$ IS LESS(+) THAN LIMIT(+) AND LESS(−) THAN LIMIT(−)

$(OUT)_N =$ LIMIT(+)

IF $(IN)_{N-2}$ IS MORE(+) THAN LIMIT(+)

$(OUT)_N =$ LIMIT(−)

IF $(IN)_{N-2}$ IS MORE(−) THAN LIMIT(−)

DIGITAL WORD MAGNITUDE SELECTION CIRCUIT APPARATUS

THE INVENTION

The present invention is related generally to electronics and more specifically to a circuit for detecting one of a given pair of serial digital words having given magnitude characteristics.

While there are possibly other methods of detecting magnitude characteristics of a pair of serial digital words, it is believed that the present method is novel and distinguishes from any known prior art. The detection of the least positive or most positive of two binary words can be accomplished by subtracting one from the other. If only the sign bit of the answer is checked, it may be determined if the subrahend is larger than the minuend in that the sign bit will be a logic 1 indicating a negative number. If the two numbers are equal or if the minuend is larger than the subtrahend, the sign bit will be a 0. To distinguish between a difference answer of 0 or a positive answer, the number must be further checked to see if a logic 1 occurs prior to the sign bit. This can be accomplished by utilizing a first flip-flop to activate a sign detecting flip-flop. The first flip-flop will become activated upon the first occurrence of a logic 1 and thereby prepare the second flip-flop for activation at the sign bit time.

It is therefore an object of the present invention to provide a novel serial digital word voter or closest to a given polarity infinite number serial digital word detector.

Other objects and advantages of the present invention may be apparent from a reading of the specification and appended claims in conjunction with the drawings wherein:

Figure 1:
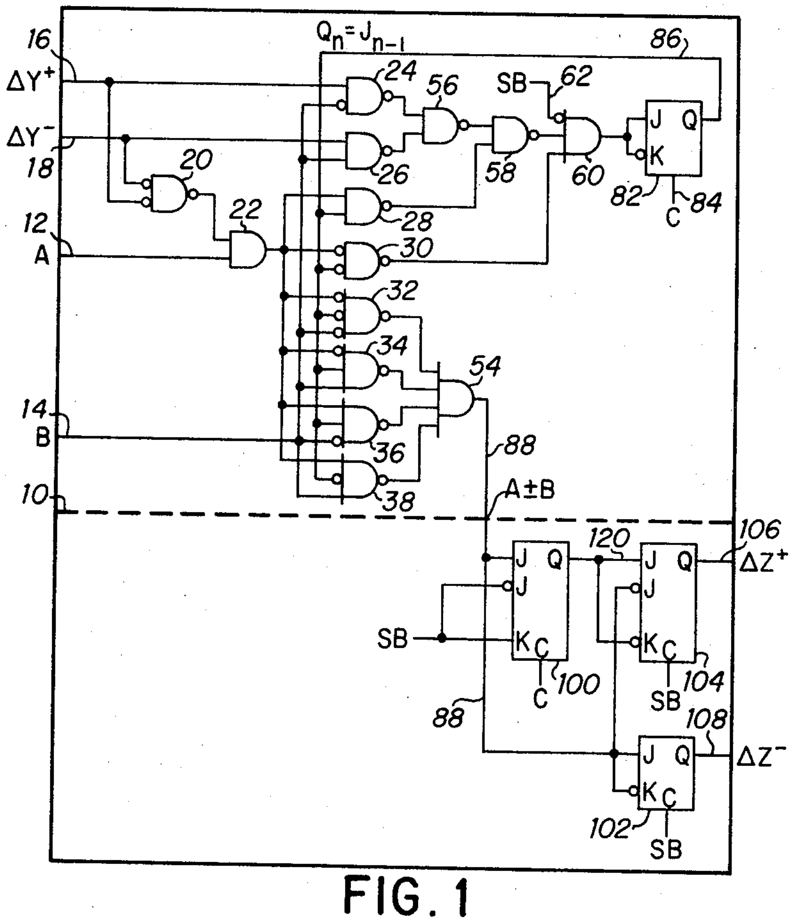
FIG. 1 is a schematic block diagram of a subtraction means and a difference numerical polarity detection means.
Figures 4, 5, 6:
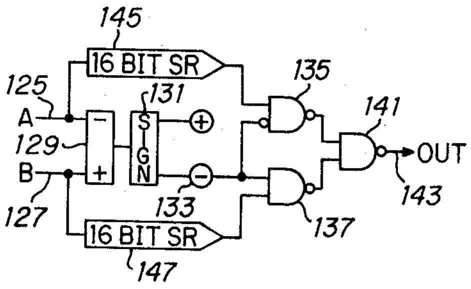
FIG. 4 represents the format of digital binary words utilized in the present application.
Figure 7:
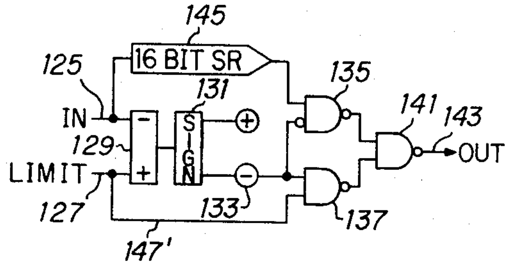
Figure 8:
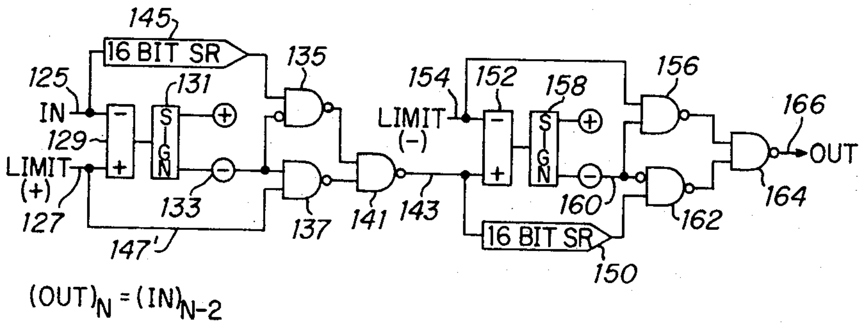
Figure 9:
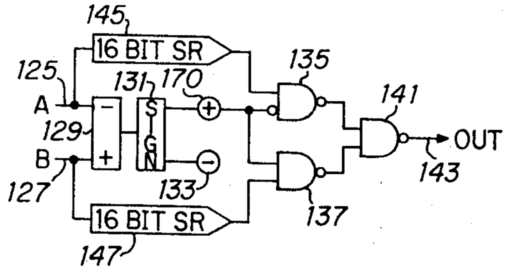

FIG. 5 indicates a bit time logic table utilized in explaining the operation of the subtraction circuit of FIG. 1;

FIG. 6 is a simplified block diagram of a serial voter or least positive numerical value detector;

FIG. 7 is a block diagram of a serial limit for providing the least positive of an input and a limit signal;

FIG. 8 is a block diagram of a device for providing an output indicative of a number as long as it does not exceed either a negative or positive limit and for providing an output only of the limit signal while the variable number exceeds the limit; and FIG. 9 is a most positive embodiment of FIG. 6.

The present invention incorporates by reference and utilizes many of the same components and some of the teachings of a co-pending application in the name of the present inventor having Ser. No. 225,443 filed 11 Feb. 1972 and entitled "Integration and Serial Filtration Apparatus" and assigned to the same assignee as the present invention. This referenced copending application may be perused for additional information as to the operation of FIG. 1.

DETAILED DESCRIPTION OF BASIC CIRCUIT

FIGS. 1–5

Although FIG. 1 does not provide the simplest method of accomplishing the objects of the present invention, it is shown since this represents a circuit which is used to practice the present invention as it is a standard circuit and is available. The portion of FIG. 1 above dash line 10 is very similar to a device sold by General Instrument Corporation Microelectronics Division in New York and labeled as MEM5021. The lower portion of FIG. 1 below dash line 10 is a circuit designed by the present inventor for the purpose of implementing the present invention.

As will be noted, the circuit of FIG. 1 has A and B inputs 12 and 14 along with $\Delta Y$ inputs 16 and 18. Throughout the description of this invention, the input 16 will be held at ground potential and the input 18 will be held at a positive 5 volt potential. This will permit the upper portion of FIG. 1 to operate only as a subtractor wherein the serial digital words supplied on input A are subtracted from the words supplied on input B. As may be ascertained from observing the figure, the referenced inputs 12–18 are connected to a plurality of AND gates 24–38, some of which have inverting inputs. The outputs of these AND gates are then connected to a further plurality of AND gates 54–60. The output of AND gate 60 is connected to a J-K flip-flop 82 having a clock input 84 and an output 86. The output 86 is labeled $Q_n$ and occurs one bit time later than the bit applied to either of the inputs A or B. The formula adjacent line 86 references the fact that the bit at the Q output occurs one bit time later than the input on the J input terminal. The upper circuitry of FIG. 1 terminates in an output 88 which is applied to the lower portion and to J inputs on J-K flip-flops 100 and 102. The flip-flop 100 also has a sync bit applied to the K input and to an inverting J input. A clock input is also applied. A Q output from flip-flop 100 is applied to a J input of a flip-flop 104 and inverted and applied to a K input. The input 88 is also inverted and applied to a J input of flip-flop 104. As will be noted, flip-flop 104 has the sync bit applied to the clock input and has a Q output applied to a positive terminal 106. In the referenced copending application this 106 output would be the positive $\Delta Z$ terminal.

The input 88 as previously referenced is applied to the J input of flip-flop 102 and it is also inverted and applied to a K input thereof. Additionally the sync bit is applied to a clock input of 102 and its Q output is connected to a negative $\Delta Z$ output terminal 108.

Reference may now be made to FIG. 5 which illustrates the outputs which may be obtained from the upper portion of FIG. 1 with specific input logic bits. This table is abbreviated since, as previously indicated, all the embodiments of the invention as disclosed herein will require that the terminal 16 be a logic 0 and terminal 18 a logic 1. From the bit logic table, it may be ascertained that the Q lead 86 at any given time provides the carry signal from the previous bit operation and that any carry bits are supplied during the following bit time as long as the sync bit has not occurred. Upon occurrence of the sync bit, the carry bit is cleared and is not allowed to impose on the next succeeding word. Other applications of the circuit of FIG. 1, as disclosed in the co-pending application compensate for this intentional destroying of the overflowing carry bit. However, it is not pertinent to the present application.

Figure 2:
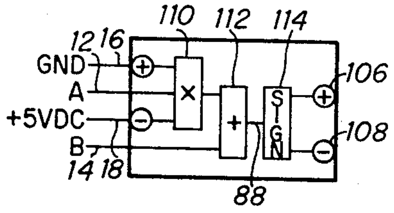
FIG. 2 illustrates in more simplified block diagram form the contents of FIG. 1.

Referring now to FIG. 2 it will be noted that the block diagram representation of FIG. 1 includes a multiplying block 110, a summing block 112 and a sign detection block 114. The remaining terminals have been supplied with the same designations as previously provided in FIG. 1. The multiplying block is, of course, not required in the form shown in the present embodiment but as previously indicated is included for convenience. Basically, the multiplying block 110 merely alters the A input to a negative signal before combining this digital word with the serial digital word B. Thus, as the A signal is applied to block 112, it is altered in format to a negative serial digital word of the same value as it had been positive. Thus, the two words are combined in the summing means 112 before the difference therebetween is applied to the sign detection circuit 114 comprising the lower half of FIG. 1. The outputs are then supplied on leads 106 and 108 in conjunction with the sign detection process.

Figure 3:
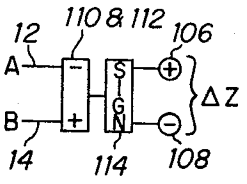
FIG. 3 represents an even more simplified block diagram indication of the contents of FIG. 2.

FIG. 3 more adequately illustrates the block of FIG. 2 with the inputs A and B merely being applied to a subtraction circuit, the output of which is supplied to a sign circuit whose output is indicated as $\Delta Z$. Only one of the two output terminals 106 and 108 will provide an output at any given time and if the two inputs A and B are identical, neither output will provide a logic 1. As indicated by the formulas in FIG. 3, terminal 106 will be a logic 1 if the word on lead 14 is more positive than the word on lead 12. If, on the other hand, the serial digital word A is more positive than the word B, the output lead 108 is a logic 1. If they are identical, both leads 106 and 108 are logic 0.

FIG. 4 illustrates that with increasing time the bits in the presented serial digital words in the format utilized in the present embodiment increase in value. Thus, the most significant bit is bit 16 or the last bit to be applied to the input terminals A and B. As is customary, a logic 0 in the 16th bit position indicates a numerical value of 0 or a positive number while a logic 1 indicates a negative number.

The lower portion of FIG. 1 utilizes the information in the 16th bit position to determine whether or not the difference answer of the subtraction process results in a negative or positive number. The J-K flip-flop 102 is only clocked with the sync bit which occurs in conjunction with the most significant or 16th bit. The sync bit is supplied from a separate source but is merely synchronous with and only with the most significant or 16th bit. Thus, if, at the most significant bit time, a logic 1 is applied to terminal J at the same time as a sync bit is applied to the clock input, a logic 1 output will be obtained on terminal 108. This output will remain for an entire word time and thus will not change until the occurrence of the next sync bit. The application of logic 1's or logic 0's to either of the J or K inputs without a corresponding sync bit applied to the clock input will have no effect. On the other hand, if at the next sync bit time there is a logic 0, indicating a positive word or a numerical 0 word, the flip-flop 102 will return to a logic 0. It will not again supply a logic 1 output until a negative word appears as indicated by the appearance of a logic 1 at the simultaneous occurrence of a sync bit.

The existence of a positive numerical word is provided by the occurrence first of a logic 1 to the J input of flip-flop 100. Since the sync bit is not occurring or in other words is a logic 0, the inversion of this at the second J input along with a clock which occurs at the time of each bit of the word, the flip-flop 100 is activated to produce a logic 1 at the Q output upon the occurrence of the first logic 1 in an incoming word. The application of further logic 1's will not alter the flip-flop and neither will the application of the further logic 0's. Thus, there is a logic 1 on lead 120 to the upper J input of flip-flop 104 and as inverted to the K input. Since the clock input of 104 is the sync bit pulse, nothing further will occur until the 16th bit time. At the time of the most significant or 16th bit, it is necessary that a logic 0 appear on lead 88 which is inverted to a logic 1 as far as flip-flop 104 is concerned and these two logic 1 inputs in combination with the sync bit will activate flip-flop 104 to produce a logic 1 at the output 106. Thus, a logic 1 occurring prior to the sync bit as would have occurred with the number minus 24,576 as may be obtained from FIG. 4 will activate flip-flop 100 but the additional existence of a logic 1 appearing on lead 88 at the time of the sync bit will prevent operation of flip-flop 104. Again, the output on 106 will remain until the occurrence of the next sync bit or in other words will remain one full word time and will occur immediately after the end of a given word. Thus the indication as to a positive or negative number input will occur during the entire application of the next word to the circuit.

As will be ascertained, if the incoming word on lead 88 is a numerical value 0, all logic 0's will be applied and thus there will be no logic 1 to activate 102 at sync bit time and there will be no logic 1 to activate flip-flop 100 so that line 120 can be a logic 1 in preparation for activating 104 at sync bit time. Thus, under the conditions of an incoming binary word having a numerical value of 0, neither of the outputs 106 or 108 will be a logic 1.

SERIAL VOTER

FIGS. 6 AND 9

In FIG. 6 an input 125 provides a serial digital word A. A Lead 127 provides a serial digital word B. These are applied to a subtraction circuit 129 and an output thereof is applied to a sign detection circuit 131. A negative output lead 133 is obtained from the sign detection circuit 131 and is applied to an inverting input of a first gate 135 and to a first input of a second gate 137. The outputs of gates 135 and 137 are inverted and applied to a gate 141 whose output is inverted and supplied as an output signal on lead 143. A first shift register 145 is connected between lead 125 and a second input of gate 135. A shift register 147 is connected between lead 127 and a further input of gate 137.

As may be ascertained, the subtraction circuit 129 is comparable to 110 and 112 of FIG. 3 while the sign detection circuit 131 is comparable with sign detection circuit 114 of FIG. 3. As will be noted, only the negative output terminal 133 of the sign detection circuit 131 is utilized. Thus, an output is obtained and supplied to the gating circuit comprising the three gates 135–141 only when the difference between A and B is negative. As will be explained infra, in the circuit to be described, the existence of a numerical 0 being received by the sign detection circuit 131 will indicate both numerical values A and B are identical and thus either one can be gated to the output. For convenience the same one is gated to the output as occurs when a positive difference is obtained. This action is provided since the gating of one type occurs only when there is a logic 1 on lead 133. In all other instances of no logic 1, the opposite switching action or gating occurs. As will be noted from the above, logic 1 does not occur when there is no difference or when the difference produces a positive numerical value. In operation, a digital word is applied to the inputs 125 and 127 and subtracted and the difference is detected by detector 131. An output appears on 133 after the completion of the entire word and for the time period of the entire following word. The two input words are stored in the shift registers 145 and 147, respectively. They are completely stored at the time that the sign detection circuit 131 determines whether the difference between the two serial digital words is positive or negative. If the difference is negative, thereby indicating that the A input or serial digital word in lead 125 is more positive than the B word, a logic 1 will be applied to AND gate 137 and an effective logic 0 will be applied to 135. It will be noted that as the word is shifted out of shift register 147 due to the continuous clock and the fact that the next word is being shifted into the receiving end of 147, an inverted 1 will be obtained from the output of 137 each time a logic 1 is received from shift register 147. The inverted logic 1 is, of course, a logic 0 as applied to gate 141. The inverted logic 1 applied to gate 135 will force an inverted logic 0 output from gate 135 continuously during that word time. Thus, gate 141 will receive a logic 1 input from gate 135. Each time a logic 0 is received from gate 137 at 141, the inverter at the output will produce a logic 1 thereby indicating a logic 1 received from shift register 147. On the other hand, the appearance of a logic 0 at the input of 137 as obtained from shift register 147 will produce an inverted logic 0 output and therefore a logic 1 input to gate 141. When two logic 1 inputs are supplied to gate 141, a logic 1 output is obtained and inverted to produce a logic 0 output. Therefore, it may be ascertained that the serial digital word B is effectively transmitted to the output lead 143. The digital word stored in 145 is not transmitted because the continuous existence of a logic 1 inverted and applied to gate 135 prevents any change in its output during the entire word time.

If a logic 0 appears on lead 133, the same steps following through the bits in the gates will provide an indication that any logic 1's appearing at the output of shift register 145 will appear on lead 143 and the gate 137 will be locked in a state whereby the outputs as inverted provide a continuous logic 1 input to gate 141.

As may be ascertained, the output on lead 143 is identical to the least positive of two input words applied to 125 and 127 and occur one word time later than they are applied to the inputs of shift registers 145 and 147. Thus, the present circuit provides a serial voter or a least positive digital word selection circuit.

A least negative or most positive digital word selection circuit may be obtained by merely connecting the positive output of sign detection circuit 131 to the gating lead now connected to lead 133. This is shown in FIG. 9 but is not explained further since the explanations follow exactly the same course as presented above. It can also be accomplished by inverting the gating output from the negative lead 133 to the inputs of gates 135 and 137. It is thus to be understood that while the explanation concentrates on a least positive indication unit, a most positive or in other words a least negative indication work unit may be provided using the teachings illustrated herein.

SERIAL LIMITER

FIG. 7

As will be noted, FIG. 7 is identical with FIG. 6 except for the lack of the shift register 147 which has been replaced by a lead 147'.

The circuit of FIG. 6 may be utilized as a limiter but it may be desirable to eliminate one shift register. This can be accomplished in FIG. 7 only if the limit value remains identically the same in all instances. Thus, the delayed limit word would be identical with the present limit word.

Using the same reasoning as used in conjunction with FIG. 6, the word appearing on output 143 would be the least positive. As long as the signal applied on lead 125 is of a lower numerical value than the limit signal, the 125 digital word would appear on the output. As soon as the word on 125 exceeded the limit word, the limit word would continuously appear on output 143 until the numerical value of the input word on lead 125 reduced in value to below that of the limit word.

SERIAL LIMITER POSITIVE AND NEGATIVE

FIG. 8

As will be noted, FIG. 8 contains the same components as contained in FIG. 7 and additionally adds a like number of components. The 143 output lead is connected to an input of a shift register 150 and to a positive input of a subtraction circuit 152. A negative limit lead 154 is supplied to the subtraction input of summing circuit or subtraction circuit 152 and is also supplied to a first input of an AND gate 156. The difference answer of 152 is supplied to sign detection circuit 158 and has a negative output supplied on a lead 160 to a second input of AND gate 156 and to an inverted input of an AND gate 162. An output of shift register 150 is supplied to a second input of gate 162. The outputs of the two gates 156 and 162 are inverted and applied to a gate 164 whose output is inverted and applied to an output lead 166.

Following the reasoning supplied above, the output on lead 143 would be the least positive of the two inputs supplied on leads 125 and 127. Thus, positive limiting occurs in the first section hereof. Using the reasoning already applied, the output on lead 166 would be the more positive of the two inputs on leads 143 and 154. Since the output on lead 143 is already prevented from going more positive than the limit 127, the output on lead 166 will be a binary digital word whose numerical value will never exceed in the negative direction the limit signal on lead 154 and never exceed in the positive direction the limit signal 127. The formulas summarize the statements above as to which output signal will appear on lead 166.

It will be ascertained that only a few embodiments of the present invention have been shown and described and that other embodiments will be apparent to one skilled in the art. While a given circuit has been supplied in FIG. 1 for practicing the present invention, other circuits will be readily apparent since as indicated the circuit of FIG. 1 was convenient and was being used for convenience rather than designing a specific new circuit to practice the present invention.

Thus, I wish to be limited not by the present specification but only by the scope of the appended claim wherein.

I claim:

1. Apparatus of the class described comprising, in combination:

first subtraction means including first and second input means and an output whereby a serial digital word signal supplied to said first input means is subtracted from a serial digital word signal supplied to said second input means and the difference is supplied as a serial digital word signal at the output;

first supply means for supplying a serial digital word input signal to said first input means of said first subtraction means;

second supply means supplying a serial digital word second signal to said second input means of said first subtraction means;

sign detection means including input means and output means, an output signal being supplied in response to an input word of a given numerical polarity;

first connection means connecting the output of said first subtraction means to the input of said detection means;

first gating means including first, second, and third input means and output means, said first gating means providing a connection of said first input means thereof to said output means thereof when a signal is supplied to said second input means thereof of a first logic value and providing a connection of said third input means thereof to said output means thereof when said input signal supplied to said second input means thereof is of a second logic value;

second connection means including shift register means connected between said first input of said first subtraction means and said first input means of said first gating means;

third connection means connecting said second input means of said first subtraction means to said third input of said gating means; and fourth connection means connecting said output means of said sign detection means to said second input means of said first gating means.

2. Apparatus as claimed in claim 1 wherein the output of said sign detection means is a logic 1 if the signal supplied thereto is a negative numerical value.

3. Apparatus as claimed in claim 2 wherein said third connection means also includes a shift register, said shift register having a binary capacity equivalent to the digital word length of the digital words supplied to said first and second input means of said subtraction means.

4. Apparatus as claimed in claim 2 wherein said sign detection means comprises three J-K flip-flops and wherein said gating means comprises at least three AND gates, the output signal from said gating means comprising a digital word, delayed one word time with respect to and equivalent to the least positive of the two digital word signals being supplied to said first and second inputs of said first subtraction means at a given word time period.

5. Apparatus comprising the apparatus of claim 1 and comprising in addition:

further means comprising the apparatus of claim 1 and connected as recited in claim 1 and further having one of the inputs of said further means connected to the output of said first gating means, the output of said further means comprising the more positive of the input signals supplied to further means.

6. Apparatus for providing an output representative of the input word closest to an infinite numerical value, in a given polar direction, of two digital input words comprising, in combination:

word detection means including first and second inputs and an output, said word detection means providing an output signal only when the numerical difference between digital input words supplied at the first and second inputs thereof results in a given numerical polarity digital word;

means for supplying digital words to said first and second inputs of said word detection means;

word storage means connected to said means for supplying said digital words to said first and second inputs for receiving words therefrom; and gating means connected to said word detection means and to said word storage means for providing an output, in response to output signals received from said word detection means indicative of the binary digital word received in a previous word time period which is the input word closest to an infinite numerical value in a given polar direction of the two digital words supplied to said word detection means as determined by the output signal from said word detection means.

7. Apparatus as claimed in claim 6 wherein the output provided by said gating means of the apparatus is indicative of the least positive numerical value of two digital input words and the word detection means provides an output signal only when the difference between the two digital input words is numerically negative.

8. Apparatus as claimed in claim 6 wherein the output provided by said gating means of said apparatus is representative of the most positive of the two input digital words and the output of the word detection means is provided only when the difference between the two digital inputs results in a negative polarity digital word.

* * * * *